US010746919B1

(12) United States Patent
Lo et al.

(10) Patent No.: US 10,746,919 B1
(45) Date of Patent: Aug. 18, 2020

(54) BACKLIGHT MODULE

(71) Applicant: AU Optronics Corporation, Hsin-Chu (TW)

(72) Inventors: Yen-Hua Lo, Hsin-Chu (TW); Hsin-Chun Huang, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 16/542,370

(22) Filed: Aug. 16, 2019

(30) Foreign Application Priority Data

Mar. 5, 2019 (TW) .............................. 108107311 A
Jul. 24, 2019 (TW) .............................. 108126223 A

(51) Int. Cl.
F21V 8/00 (2006.01)

(52) U.S. Cl.
CPC ......... G02B 6/0078 (2013.01); G02B 6/0088 (2013.01)

(58) Field of Classification Search
CPC ............................. G02B 6/0078; G02B 6/0088
See application file for complete search history.

(56) References Cited

U.S. PATENT DOCUMENTS

| 2009/0129119 A1* | 5/2009 | Lee ..................... B29C 33/3842 362/619 |
| 2010/0278480 A1* | 11/2010 | Vasylyev ............... G02B 3/005 385/33 |
| 2011/0037740 A1* | 2/2011 | Yamaguchi .......... G02B 6/0031 345/204 |
| 2012/0050649 A1* | 3/2012 | Yeo ......................... G02B 6/002 349/65 |
| 2013/0258716 A1* | 10/2013 | Fang ....................... G09F 13/04 362/613 |
| 2013/0265506 A1* | 10/2013 | Nishimura ........... G02B 5/0242 349/12 |
| 2014/0300845 A1* | 10/2014 | Tamaki ............. G02F 1/133514 349/65 |
| 2015/0185400 A1* | 7/2015 | Lee ...................... G02B 6/0058 362/613 |
| 2017/0102139 A1* | 4/2017 | Iizawa .................... F21V 29/70 |
| 2017/0315358 A1* | 11/2017 | Masuda ................. G02B 6/002 |
| 2018/0005003 A1* | 1/2018 | Ryu ....................... G06F 3/0421 |
| 2019/0167093 A1* | 6/2019 | Breuninger ............... G06T 7/74 |
| 2019/0227218 A1* | 7/2019 | Kawano ............... G02B 6/0051 |
| 2020/0018885 A1* | 1/2020 | Wang ................... G02B 6/0016 |

FOREIGN PATENT DOCUMENTS

CN 206960700 U 2/2018

* cited by examiner

Primary Examiner — Tsion Tumebo
(74) Attorney, Agent, or Firm — WPAT, PC

(57) ABSTRACT

A backlight module includes a light guide plate that has a first side and a second side, a light emitting element, and a light guide element. The light emitting element is adjacent to the first side of the light guide plate. The light guide element is disposed between the first side and the second side, and forms a first opening therein. The light guide element includes a first refractive part and a second refractive part. The first refractive part has a first refractive index, the second refractive part has a second refractive index, and the first refractive index and the second refractive index are different from a refractive index of the light guide plate. The orthogonal projections of the first refractive part and the second refractive part on the first side are non-overlapped with each other.

18 Claims, 11 Drawing Sheets

US 10,746,919 B1

BACKLIGHT MODULE

RELATED APPLICATION

This application claims priority to Taiwan Application Serial Number 108107311, filed Mar. 5, 2019, and Taiwan Application Serial Number 108126223, filed Jul. 24, 2019, all of which are herein incorporated by reference.

BACKGROUND

Technical Field

The present disclosure relates to a backlight module.

Description of Related Art

In conventional handheld electronic devices, a variety of functional components are buried in the areas of the upper frame and the lower frame. In some electronic devices nowadays, the design of the upper frame is called off and the front camera is disposed in the center of the display area in order to pursue a higher screen-to-body ratio. However, as a result, an opening need to be formed in the display module and the backlight module in the display area, and such a design may cause a problem of nonuniform brightness near the opening of the display area. Therefore, how to solve the above problem is one of the important topics in the field.

SUMMARY

The present disclosure is related to a backlight module. The backlight module includes a light guide plate, a light emitting element, and a light guide element. The light guide plate has a first side and a second side. The light emitting element is adjacent to the first side of the light guide plate. The light guide element is disposed between the first side and the second side, and forms a first opening therein. The light guide element includes a first refractive part and a second refractive part. The first refractive part has a first refractive index, and the second refractive part has a second refractive index, in which the first refractive index and the second refractive index are different from a refractive index of the light guide plate. The orthogonal projections of the first refractive part and the second refractive part on the first side are non-overlapped with each other.

In summary, the backlight module provided in the present disclosure is able to guide the light emitted by the light emitting element on the first side to an end of the first opening close to the second side, thereby avoiding the problem that the light intensity cannot be uniformly distributed due to the first opening of the backlight module.

DETAILED DESCRIPTION

For the embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

Figure 1:
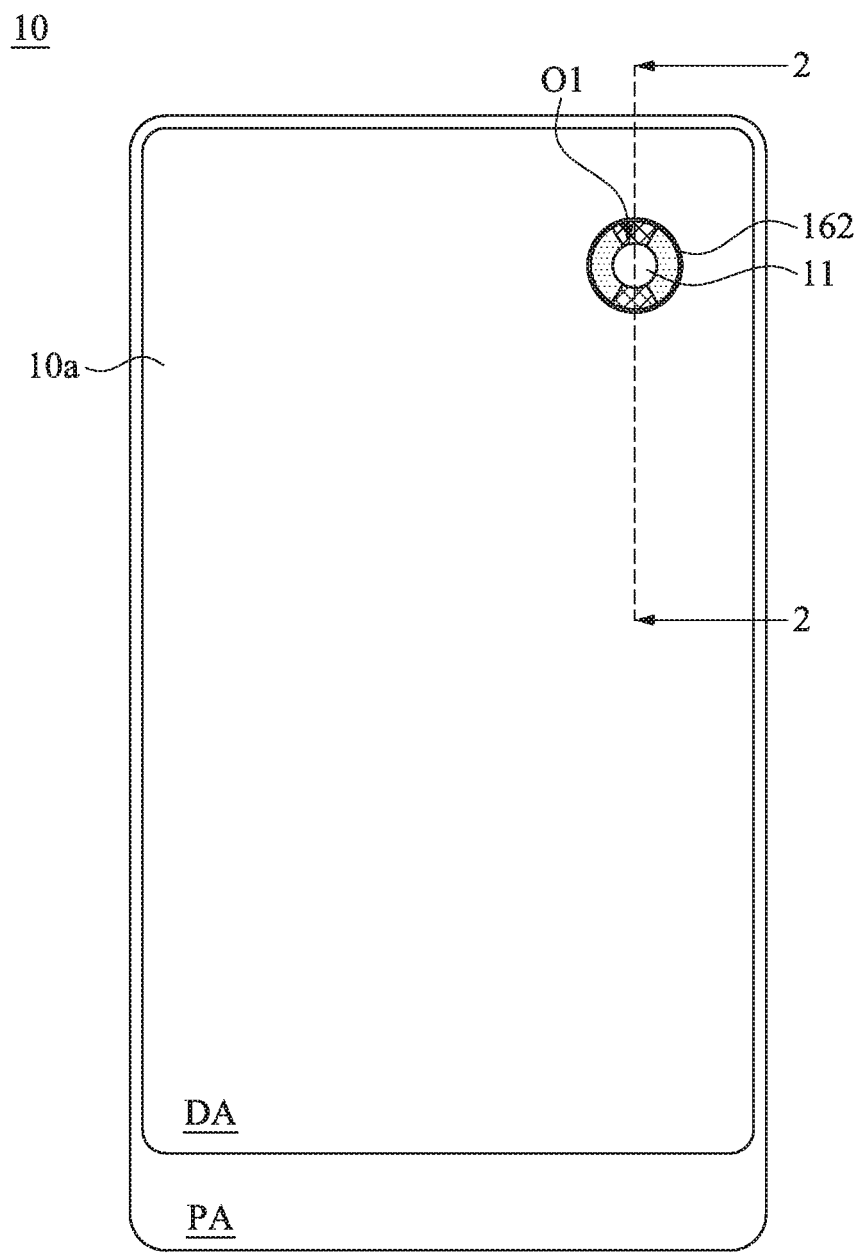
FIG. 1 is a front view of an electronic device according to one embodiment of the present disclosure.

Referring to FIG. 1, which illustrates a front view of an electronic device 10 according to an embodiment of the present disclosure. Taking the present embodiment as an example, the electronic device 10 is a mobile phone having a display function and a photographing function. As shown in FIG. 1, the first surface 10a of the electronic device 10 has a display area DA and a frame area PA, in which the display area DA may display color images, and a first opening O1 is formed in the display area DA.

As shown in FIG. 1, the electronic device 10 further includes a camera module 11. The photographying module 11 is disposed in the first opening O1. In the present embodiment, the camera module 11 may include a charged coupled device (CCD), and the lens there of faces toward the first surface 10a, thereby allowing the electronic device 10 to capture an external image facing the first surface 10a.

Figure 2:
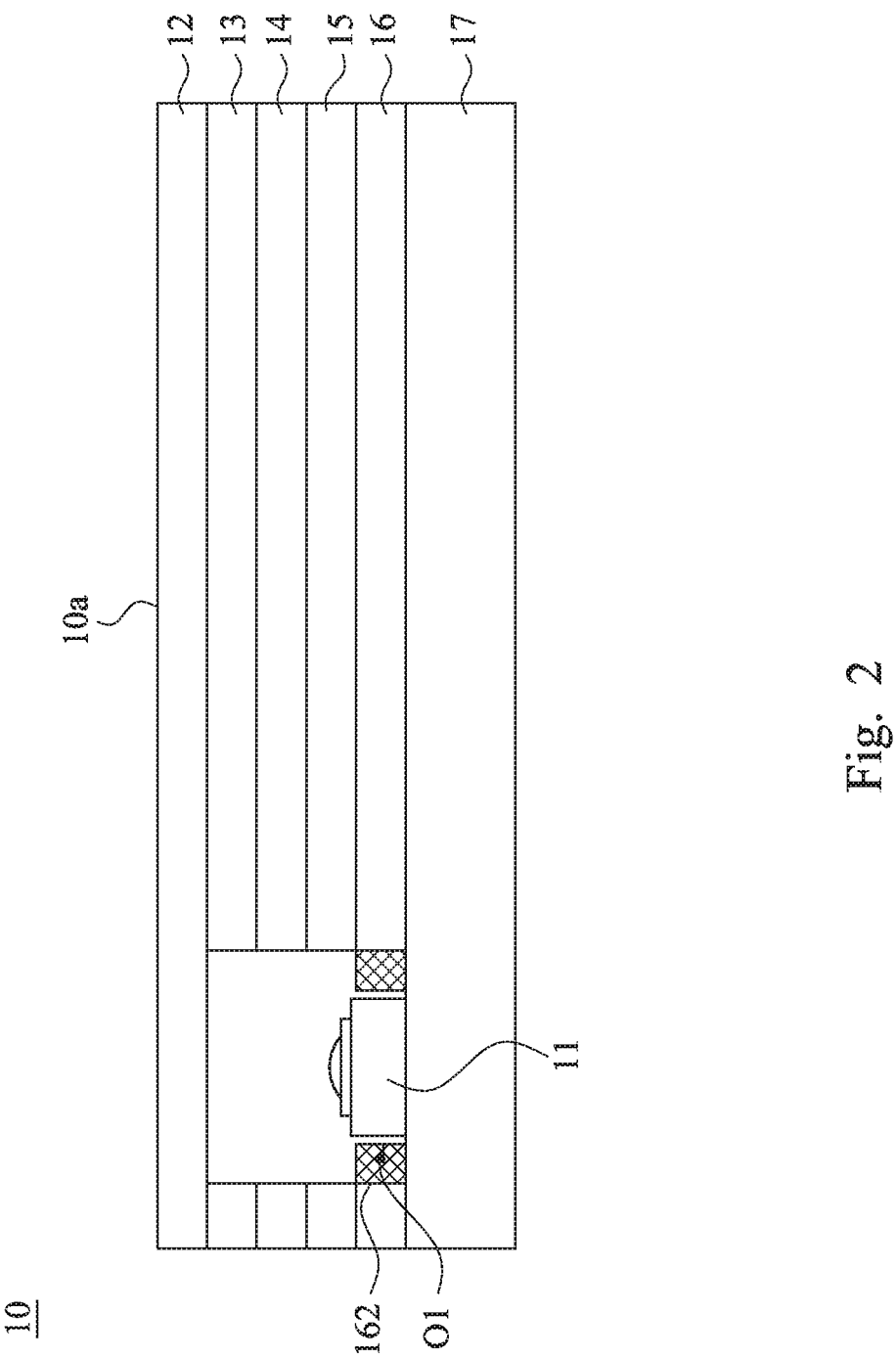
FIG. 2 is a cross-sectional view taken along line 2-2 shown in FIG. 1.

Next, referring to FIG. 2, which illustrates a cross-sectional view taken along line 2-2 shown in FIG. 1. As shown in FIG. 2, the electronic device 10 further includes a cover glass 12, a display module (including a filter layer 13, a liquid crystal layer 14, and a voltage control layer 15), a backlight module 16, and a back cover module 17.

As shown in FIG. 2, the cover glass 12 can be made of glass, acrylic or other types of transparent materials. The cover glass 12 forms the first surface 10a of the electronic device 10. The cover glass 12 may protect components inside the electronic device 10 from the damage caused by the external environment.

As shown in FIG. 2, the display module in the present embodiment is a liquid crystal display (LCD) module, and the filter layer 13 includes a color filter therein. For example, in the present embodiment, the filter layer 13 includes a red filter layer, a blue filter layer, and a green filter layer. Different color filter layers allow light of different wavelengths to pass through. The filter layer with each color defines one sub-pixel, and multiple sub-pixels define one pixel unit.

As shown in FIG. 2, the liquid crystal layer 14 and the voltage control layer 15 are disposed between the filter layer 13 and the backlight module 16. The liquid crystal layer 14 contains liquid crystal molecules. The voltage control layer 15 includes sub-pixel electrodes, thin film transistors (TFTs), data lines, and scan lines. Each of the sub-pixel electrodes corresponds to one thin film transistor, each thin film transistor corresponds to one sub-pixel, and each set of data lines and scan lines corresponds to one thin film transistor. The external controller can individually control the switching of each thin film transistor through the data line and the scan line. According to the switching of the thin film transistor, the sub-pixel electrode applies different degrees of voltage to the liquid crystal molecules in the liquid crystal layer 14, and changes the tilt angles of the liquid crystal molecules, thereby controlling the light transmittance in each sub-pixel.

The backlight module 16 can provide light that is transmitted toward the first surface 10a. The light sequentially passes through the voltage control layer 15, the liquid crystal layer 14, and the filter layer 13 that are located above the backlight module. As described above, the voltage control layer 15 and the liquid crystal layer 14 can control the light transmittance in different sub-pixels, and thereafter the light is converted into color light with different colors while passing through the filter layer 13. As a result, the electronic device 10 can display color images by the filter layer 13, the liquid crystal layer 14, the voltage control layer 15, and the backlight module 16.

As shown in FIG. 2, the back cover module 17 can include a variety of different functional components, such as a processor, a battery, a radio or a playback device, and the like. The present disclosure is not limited thereto, and thus the above elements are not explicitly shown in FIG. 2. In the present embodiment, the camera module 11 is disposed on the back cover module 17 and protrudes toward the first surface 10a.

As shown in FIG. 2, the first opening O1 of the electronic device 10 is located within the filter layer 13, the liquid crystal layer 14, the voltage control layer 15, and the backlight module 16. The first opening O1 extends through the filter layer 13, the liquid crystal layer 14, the voltage control layer 15, and the backlight module 16, so that the camera module 11 is able to be accommodated in the first opening O1. With the above design, the camera module 11 of the electronic device 10 can be located within the display area DA (see FIG. 1), so that the display area DA can extend and surround the camera module 11 to increase the area of the display area DA.

Figure 3:
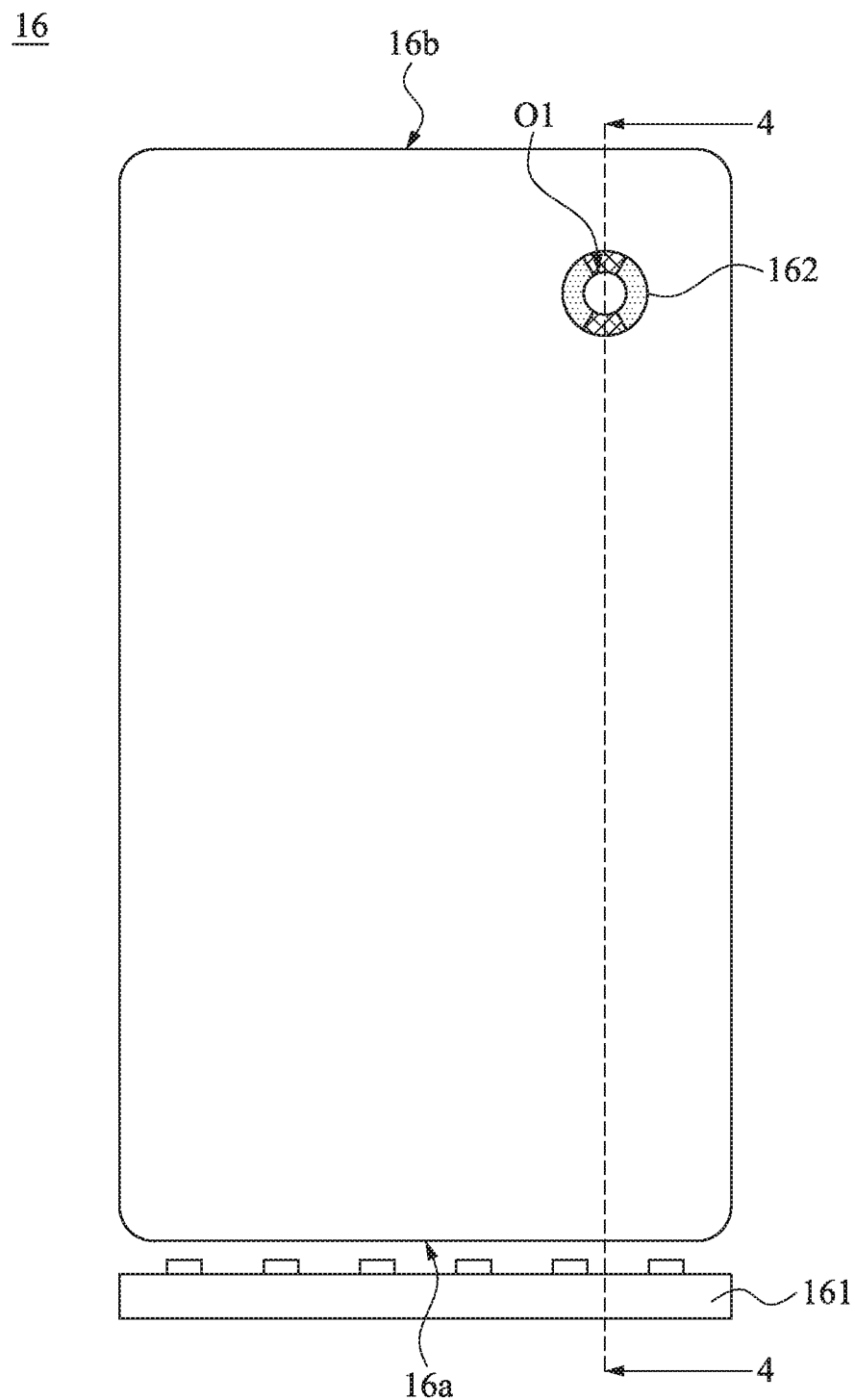
FIG. 3 is a front view of a backlight module in the electronic device according to the embodiment of FIG. 1.
Figure 4:
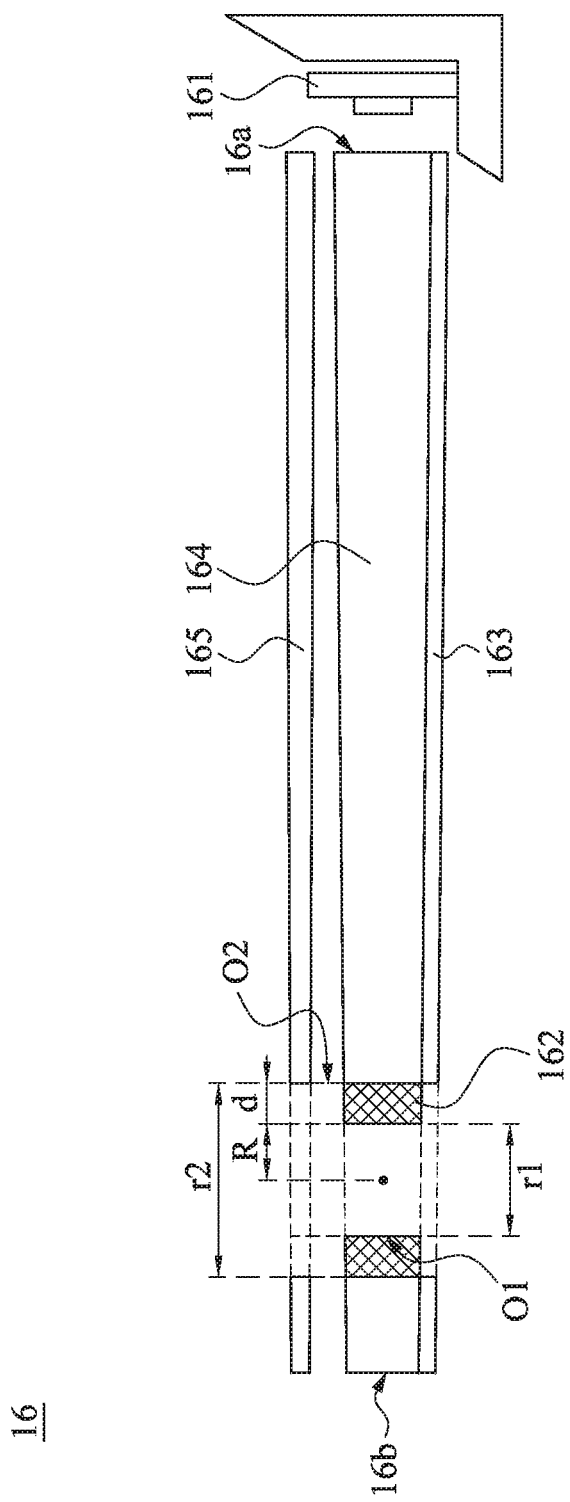
FIG. 4 is a cross-sectional view taken along line 4-4 in FIG. 3.

Next, referring to FIG. 3 and FIG. 4. FIG. 3 illustrates a front view of the backlight module 16 in the electronic device 10 according to the embodiment of FIG. 1. FIG. 4 is a cross-sectional view taken along line 4-4 shown in FIG. 3. The light guide plate 164 has a first side 16a and a second side 16b opposite the first side 16a, and the first opening O1 is disposed between the first side 16a and the second side 16b.

As shown in FIG. 4, in the present embodiment, the backlight module 16 includes a light emitting element 161, a light guide element 162, a reflective film 163, a light guide plate (LGP) 164, and a diffusion film 165. The light emitting element 161 is close to the first side 16a of the light guide plate 164. The light guide element 162 is closer to the second side 16b of the light guide plate 164 and the first opening O1 is formed therein. In other words, a distance between the light guide element 162 and the second side 16b is smaller than a distance between the light guide element 162 and the first side 16a. The light guide plate 164 is disposed between the reflective film 163 and the diffusion film 165, in which the diffusion film 165 is closer to the first surface 10a of the electronic device 10 (refer to FIG. 1).

As shown in FIG. 4, the light emitting element 161 can be a light emitting diode (LED) or other light emitting elements. The light emitting element 161 is configured to emit light toward the second side 16b of the light guide plate 164. The light is guided by the reflective film 163 and the light guide plate 164 to change its traveling direction, and finally passes through the diffusion film 165 and leaves the backlight module 16. Specifically, the backlight module 16 in the present embodiment is side-light type, that is, the light emitting element 161 is located on one side of the display area DA of the electronic device 10 (refer to FIG. 1 simultaneously).

As shown in FIG. 4, a portion of the light emitted by the light emitting element 161 reaches the first opening O1. The light guide element 162 is configured to guide the light to reach an end of the first opening O1 close to the second side 16b. As a result, it can be ensured that the light emitted by the light emitting element 161 can uniformly reach the space near the second side 16b of the light guide plate 164 without overflowing from the first opening O1. In the present embodiment, the light guide element 162 is detachably disposed in the backlight module 16. In other words, as shown in FIG. 4, the backlight module 16 has a second opening O2, and the light guide element 162 is detachably disposed within the second opening O2. As shown in FIG. 4, the first opening O1 has an inner diameter r1, and the second opening O2 has an outer diameter r2, in which the inner diameter r1 is smaller than the outer diameter r2. Next, various embodiments of the detachable light guide element 162 will be described with reference to FIG. 5 to FIG. 11. However, it should be understood that one skilled in the art can make changes according to actual needs, and thus it is not limited to those shown in FIG. 5 to FIG. 11.

Figure 5:
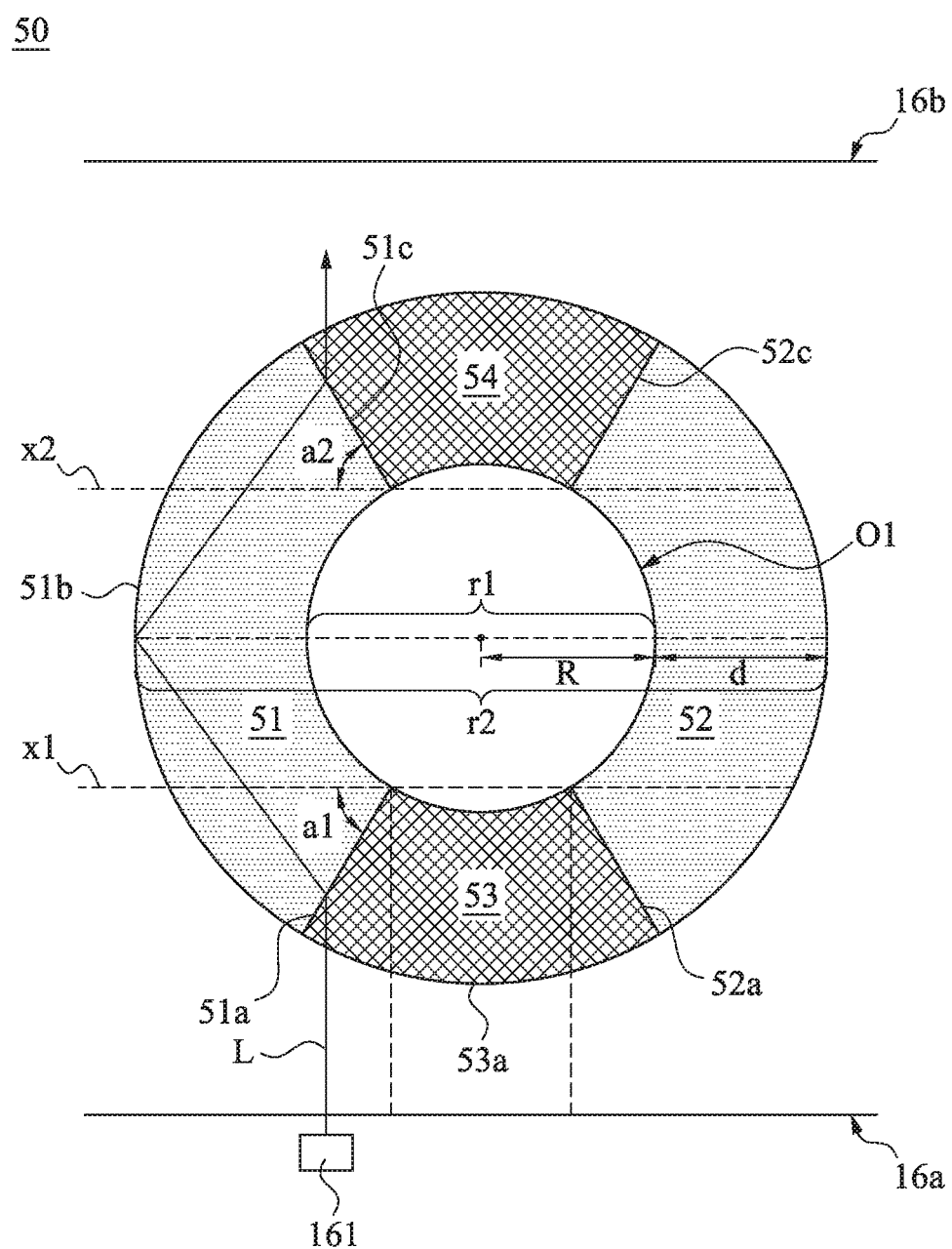
FIG. 5 is a top view of a light guide element according to one embodiment of the present disclosure.

Referring to FIG. 5, which illustrates a top view of a light guide element 50 according to one embodiment of the present disclosure. In the present embodiment, the light guide element 50 is actually the light guide element 162 in FIG. 3 and FIG. 4. Therefore, the following description of FIG. 5 may also refer to FIG. 3 and FIG. 4 simultaneously.

As shown in FIG. 5, the light guide element 50 is ring-shaped entirely, and the first opening O1 is formed in the center thereof. Specifically, the light guide element 50 has an inner diameter r1 and an outer diameter r2, in which the inner diameter r1 defines the size of the first opening O1 and the outer diameter r2 defines the size of the second opening O2 (refer to FIG. 4 simultaneously). It should be understood that the dimensions of the elements in FIG. 5 are not shown in actual scale. In some embodiments, a distance between an outer edge of the light guide element 50 and the first opening O1 is d, and a radius of the first opening O1 is R, which satisfy d≤R/10 to achieve better light transmission effect.

As shown in FIG. 5, the light guide element 50 includes a first refractive part 51 and a second refractive part 52, in which the orthogonal projections of the first refractive part 51 and the second refractive part 52 on the first side 16a of the light guide plate 164 are non-overlapped with each other. The first refractive part 51 and the second refractive part 52 may be made of transparent refractive materials. For example, the first refractive part 51 and the second refractive part 52 may be made of a resin. The first refractive part 51 has a first refractive index n1, and the second refractive part 52 has a second refractive index n2. In the present embodiment, the first refractive part 51 and the second refractive part 52 are made of the same material, and thus the first refractive index n1 is equal to the second refractive index n2.

As shown in FIG. 5, the light guide element 50 further includes a third refractive part 53 and a fourth refractive part 54. The third refractive part 53 and the fourth refractive part 54 are connected to the first refractive part 51 and the second refractive part 52, and the third refractive part 53 is closer to the first side 16a than the fourth refractive part 54. The third refractive part 53 and the fourth refractive part 54 may be made of transparent refractive materials. In the present embodiment, the third refractive part 53 has a third refractive index n3, and the fourth refractive part 54 has a fourth refractive index n4. In the present embodiment, the third refractive part 53 and the fourth refractive part 54 may be made of the same material, and thus the third refractive index n3 is equal to the fourth refractive index n4. More specifically, the third refractive index n3 and the fourth refractive index n4 are equal to the refractive index of the light guide plate 164 in FIG. 4.

Referring to FIG. 3 and FIG. 5 simultaneously, it should be understood that the third refractive part 53 is closer to the light emitting element 161. Therefore, the light L emitted from the light emitting element 161 firstly passes through the light guide plate 164 and then enters the third refractive part 53. In the present embodiment, since the refractive indices of the light guide plate 164 and the third refractive part 53 are the same, the light L does not deflect after passing through the interface 53a between the light guide plate 164 and the third refractive part 53.

Thereafter, as shown in FIG. 5, the light L passes through the interface 51a between the third refractive part 53 and the first refractive part 51 (or the interface 52a between the third refractive part 53 and the second refractive part 52). In the present embodiment, the first refractive index n1 of the first refractive part 51 is greater than the third refractive index n3 of the third refractive part 53. Due to the difference between the above refractive indices, the first refractive part 51 guides the light L to be deflected.

Next, as shown in FIG. 5, after leaving the interface 51a between the first refractive part 51 and the third refractive part 53, the light L is incident on the interface 51b between the first refractive part 51 and the light guide plate 164. Since the incident angle of the light L at the interface 51b is smaller than the total reflection angle of the interface 51b, the light L is reflected and shifted in the direction toward the first opening O1.

Finally, as shown in FIG. 5, the light L shifted in the direction toward the first opening O1 is incident on the interface 51c between the first refractive part 51 and the fourth refractive part 54. In the present embodiment, the first refractive index n1 of the first refractive part 51 is greater than the fourth refractive index n4 of the fourth refractive part 54. Due to the difference between the above refractive indices, the fourth refractive part 54 guides the light L away from the first opening O1.

As shown in FIG. 5, the light L incident on the light guide element 50 from the front of the first opening O1 is guided to the rear of the first opening O1 and is advanced toward the second side 16b, and the emergent direction is close to the incident direction. In other words, the light guide element 50 enables the light L to be uniformly distributed to a region close to the second side 16b of the light guide plate 164 (refer to FIG. 3). As a result, the brightness uniformity of the display area DA (see FIG. 1) of the electronic device 10 can be ensured.

As shown in FIG. 5, the horizontal axis x1 at the intersection of the interface 51a and the first opening O1 is parallel to the first side 16a, and there is an angle a1 between the interface 51a and the horizontal axis x1. Similarly, the horizontal axis x2 at the intersection of the interface 51c and the first opening O1 is parallel to the first side 16a and the second side 16b, and there is an angle a2 between the interface 51c and the horizontal axis x2. In the present embodiment, the interface 51a is located below the horizontal axis x1 and the interface 51c is located above the horizontal axis x2. In other words, the directions of the angle a1 and the angle a2 are contrary, but the values of them are the same (the difference between them is a minus).

Different angle a1 and angle a2 may affect the degree of deflection of the light L. Specifically, the incident angle incident on the interface 51b should be smaller than the total reflection angle of the interface 51b, so that the light L can reach the fourth refractive part 54. The angle a1 of the interface 51a and the angle a2 of the interface 51c affect the degree of deflection of the light L. One skilled in the art can adjust the angle a1 and the angle a2 according to actual needs, so that the maximum proportion of the light L can be successfully reflected by the interface 51c to the fourth refractive part 54.

Figure 6:
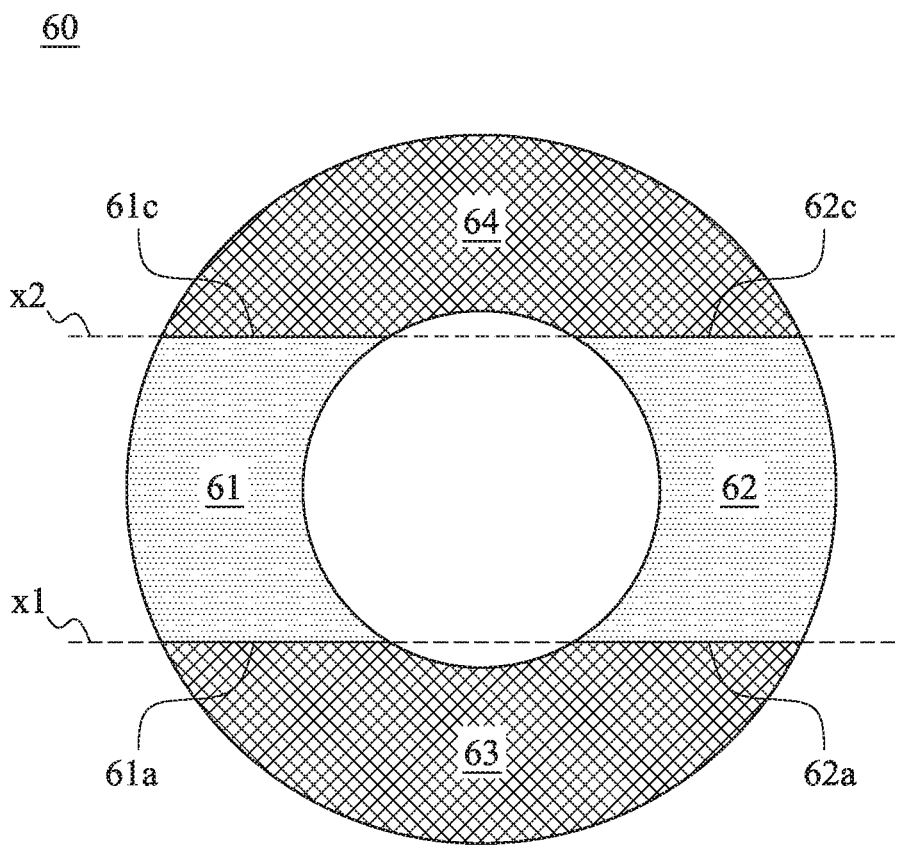
FIG. 6 is a top view of a light guide element according to another embodiment of the present disclosure.

For example, referring to FIG. 6 herein, which illustrates a top view of a light guide element 60 according to another embodiment of the present disclosure. As shown in FIG. 6, the light guide element 60 is entirely the same as the light guide element 50, and the difference is that the inclination angles of the interface 61a and the interface 61c of the light guide element 60 are different from that of the interfaces 51a and 51c. Specifically, in FIG. 6, the interface 61a is parallel to the horizontal axis x1, and the interface 61c is parallel to the horizontal axis x2. In other words, in the present embodiment, the angle a1 and the angle a2 are both zero.

Figure 7:
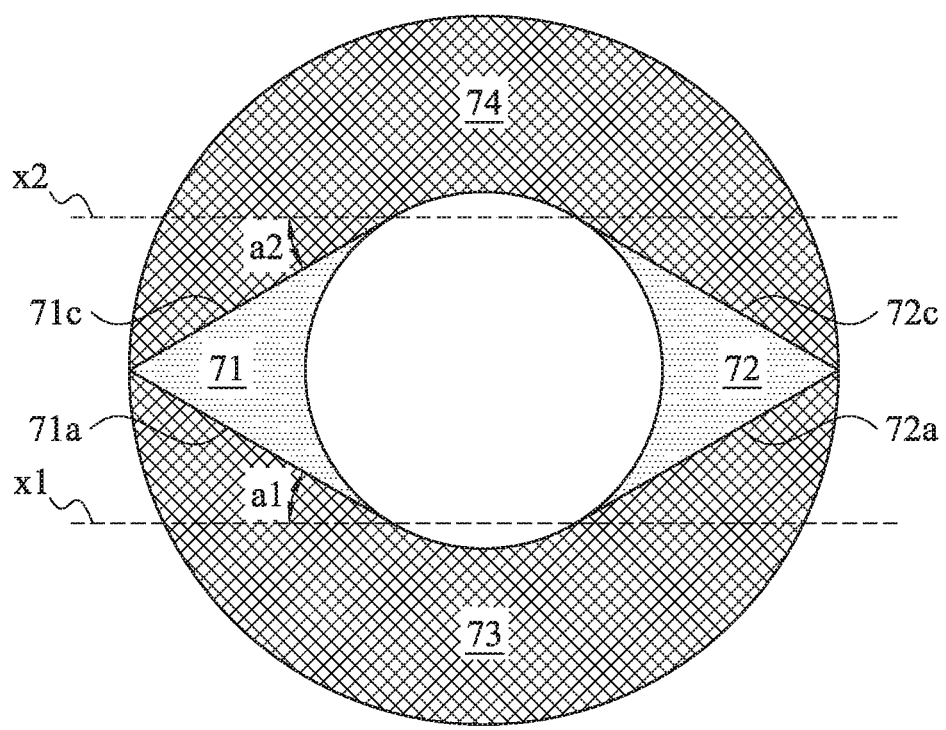
FIG. 7 is a top view of a light guide element according to another embodiment of the present disclosure.

Alternatively, referring to FIG. 7, which illustrates a top view of a light guide element 70 according to another embodiment of the present disclosure. As shown in FIG. 7, the light guide element 70 is entirely the same as the light guide element 50, and the difference is that the inclination angles of the interface 71a and the interface 71c of the light guide element 70 are different from that of the interfaces 51a and 51c. In the present embodiment, the interface 71a is located above the horizontal axis x1, and the interface 71c is located below the horizontal axis x2. In other words, the signs of the angle a1 and the angle a2 in the present embodiment are opposite to that shown in FIG. 5.

Figure 8:
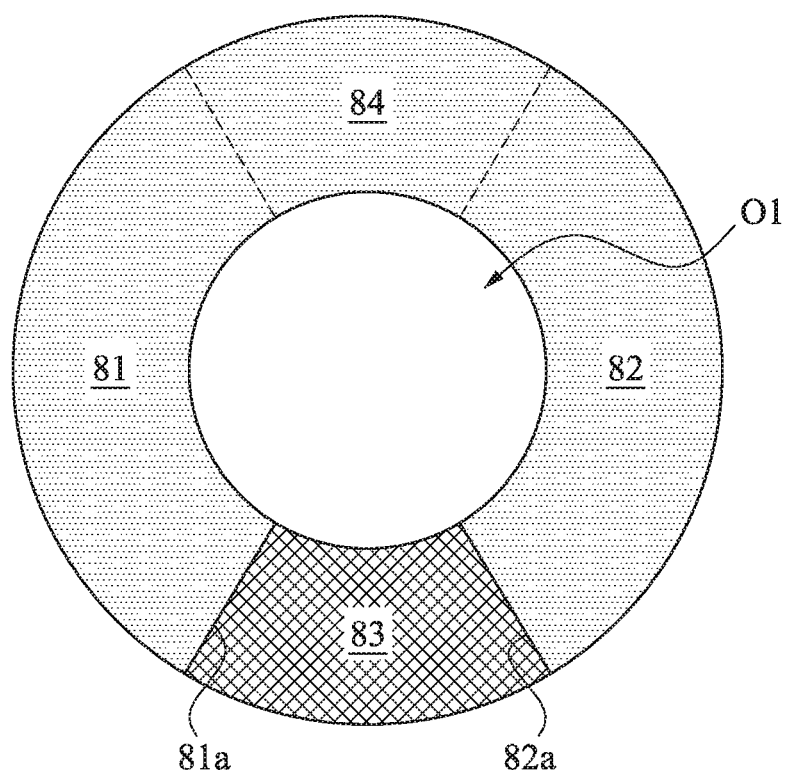
FIG. 8 is a top view of a light guide element according to another embodiment of the present disclosure.

Next, referring to FIG. 8, which illustrates a top view of a light guide element 80 according to another embodiment of the present disclosure. As shown in FIG. 8, the light guide element 80 is entirely the same as the light guide element 50, and the difference is that the first refractive part 81, the second refractive part 82, and the fourth refractive part 84 of the light guide element 80 are combined with each other. In other words, in the present embodiment, the first refractive part 81, the second refractive part 82, and the fourth refractive part 84 are made of the same material, and the three are integrally formed such that the first refractive part 81, the second refractive part 82, and the fourth refractive parts 84 are combined into one C-shaped refractive part. In the present embodiment, the light can be guided through the interface 81a to the fourth refractive part 84 behind the first opening O1. In addition, the design in which the rear of the first opening O1 is changed to the C-shape has an advantage of being easy to manufacture.

Figure 9:
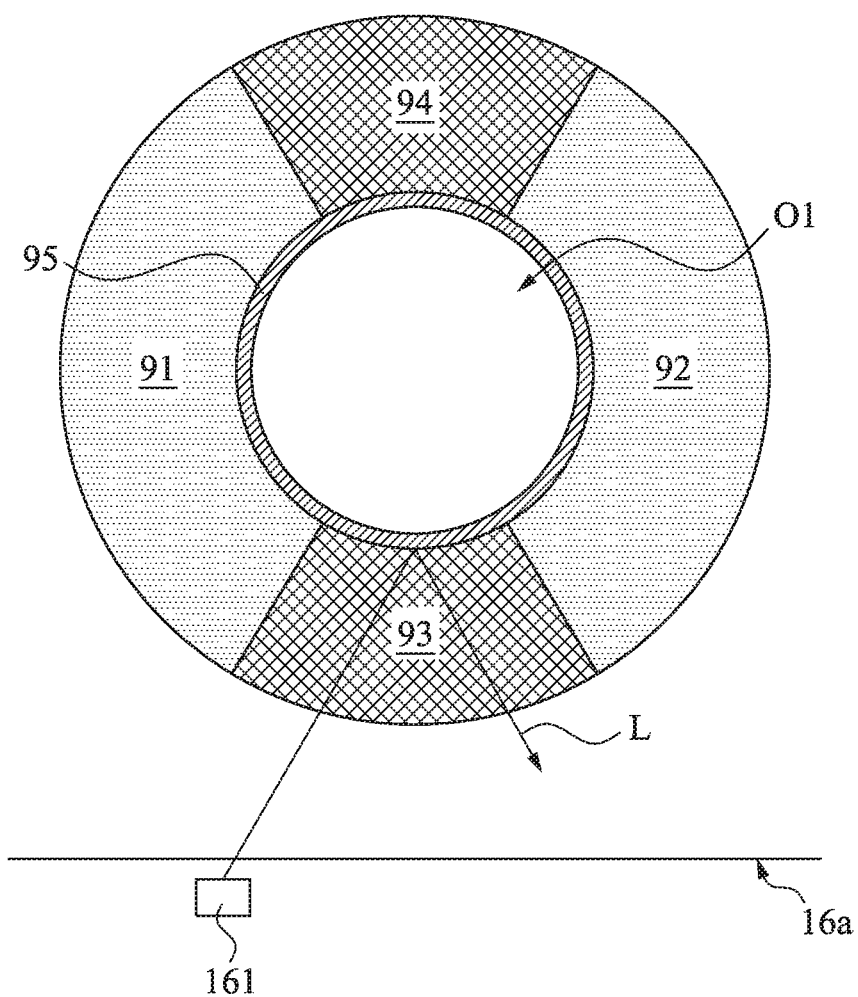
FIG. 9 is a top view of a light guide element according to another embodiment of the present disclosure.

Next, referring to FIG. 9, which illustrates a top view of a light guide element 90 according to another embodiment of the present disclosure. The light guide element 90 is entirely the same as the light guide element 50, and the difference is that the light guide element 90 further includes a reflective ring 95.

As shown in FIG. 9, the reflective ring 95 is located at the center of the light guide element 90 and surrounds the first opening O1. The reflective ring 95 may be disposed on an inner surface of the first opening O1. Specifically, the reflective ring 95 can be a reflective metal ring, or a ring structure made of other total reflective materials. By disposing the reflective ring 95 around the first opening O1, it is able to prevent a portion of the light L that is not guided by the first refractive part 91 from directly entering the first opening O1. As a result, it is ensured that the camera module 11 (see FIG. 2) located in the first opening O1 is not disturbed by the light. In addition, the reflective ring 95 may also be disposed in the embodiment of FIG. 7, and the embodiment of FIG. 7 needs the configuration of the reflective ring 95 more than that of FIG. 5.

Figure 10:
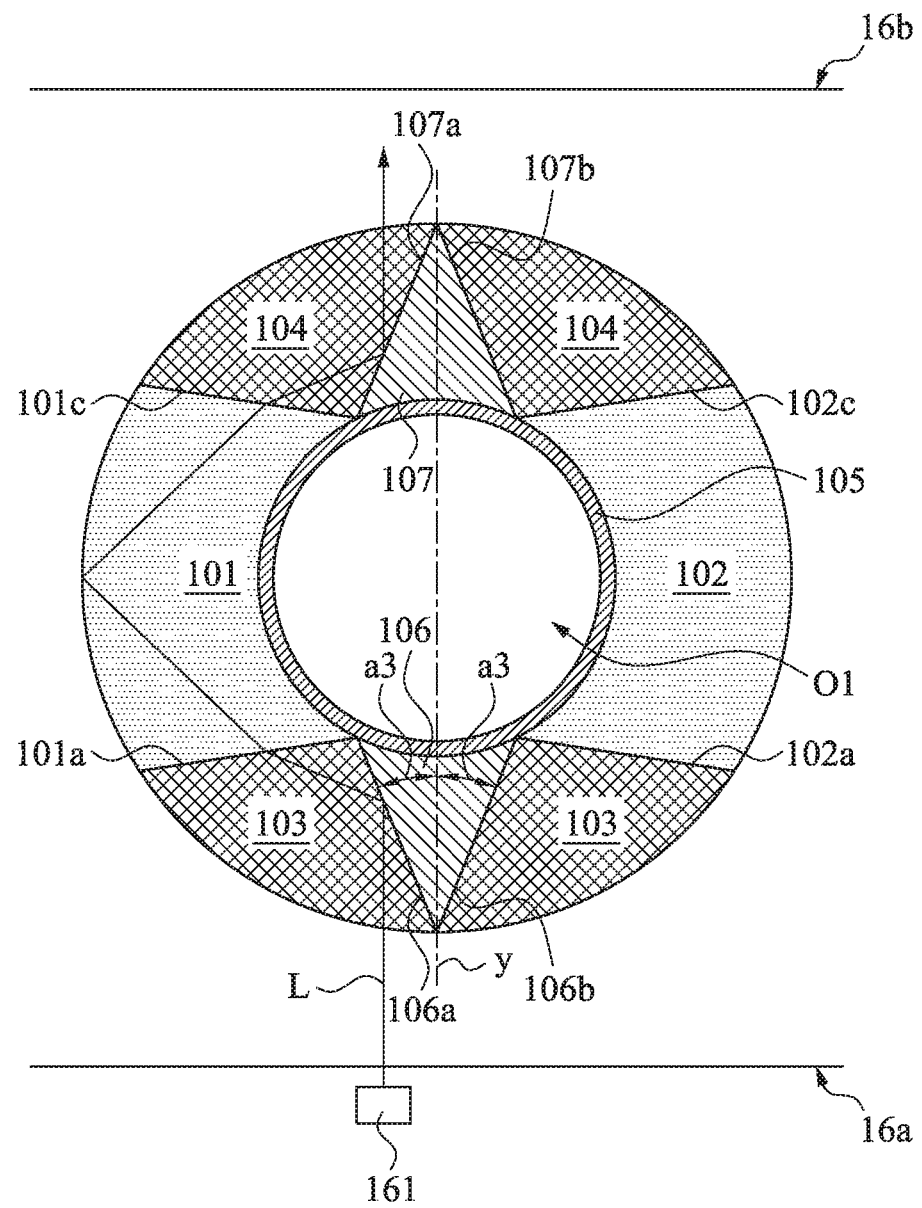
FIG. 10 is a top view of a light guide element according to another embodiment of the present disclosure.

Next, referring to FIG. 10, which illustrates a top view of a light guide element 100 according to another embodiment of the present disclosure. As shown in FIG. 10, the light guide element 100 is similar to the light guide element 90, and the difference is that the light guide element 100 further includes a first reflective part 106 and a second reflective part 107, and the angle a1 and the angle a2 are slightly different. In this embodiment, the reflective ring 105 may not exist, and may be omitted, such that the first reflective part 106 may be directly connected to the first opening O1.

As shown in FIG. 10, the first reflective part 106 and the second reflective part 107 may be made of metal or various reflective materials. The first reflective part 106 and the second reflective part 107 are respectively disposed in the third refractive part 103 and the fourth refractive part 104, and each of the first reflective part 106 and the second reflective part 107 is disposed between the first refractive part 101 and the second refractive part 102. In the present embodiment, the first reflective part 106 has a reflective surface 106a and a reflective surface 106b. The reflective surface 106a is connected to the interface 101a, and the reflective surface 106b is connected to the interface 102a. Similarly, the second reflective part 107 has a reflective surface 107a and a reflective surface 107b. The reflective surface 107a is connected to the interface 101c, and the reflective surface 107b is connected to the interface 102c.

As shown in FIG. 10, by disposing the first reflective part 106 in the third refractive part 103, the emitted light L can be incident on the interface 101a and the interface 102a through the guiding of the reflective surface 106a and the reflective surface 106b. The subsequent progression of the light L is similar to that shown in FIG. 5, and thus the description will not be repeated herein.

As shown in FIG. 10, the third refractive part 103 and the fourth refractive part 104 in the present embodiment are substantially the same. By disposing the second reflective part 107 in the fourth refractive part 104, it enables the light L emergent from the interface 101c and the interface 102c can be guided through the reflective surface 107a and the reflective surface 107b to leave the light guide element 100 in the uniform direction. In summary, by designing the first reflective part 106 and the second reflective part 107 in the light guide element 100, it further enables more light L to be guided to one side of the first opening O1 close to the second side 16b, and thus the brightness uniformity of the display area DA of the electronic device 10 is improved (refer to both FIG. 1 and FIG. 3).

As shown in FIG. 10, there is an angle a3 between the reflective surface 106a and the vertical axis y, and there is also an angle a3 between the reflective surface 106b and the vertical axis y with opposite direction. In the present embodiment, the following mathematical relation (1) between the angle a3, the first refractive index $n_{101}$ of the first refractive part 101 and the third refractive index $n_{103}$ of the third refractive part 103 is satisfied by:

$$a3 > \frac{\pi}{2} - \arcsin\left(\frac{n_{101}}{n_{103}} * \sin\left(\frac{\pi}{2} - \arcsin\left(\frac{n_{103}}{n_{101}}\right)\right)\right) \quad (1)$$

For example, in one embodiment, the first refractive index $n_{101}$ of the first refractive part 101 is between 1.51 and 2.10, the third refractive index $n_{103}$ of the third refractive part 103 is 1.5, and the angle a3 is between 12 and 83 degrees. As shown in FIG. 10, the angle between the reflective surface 106a and the reflective surface 106b is twice the angle a3, that is, the angle between the two reflective surfaces is between about 24 and 166 degrees.

Figure 11:
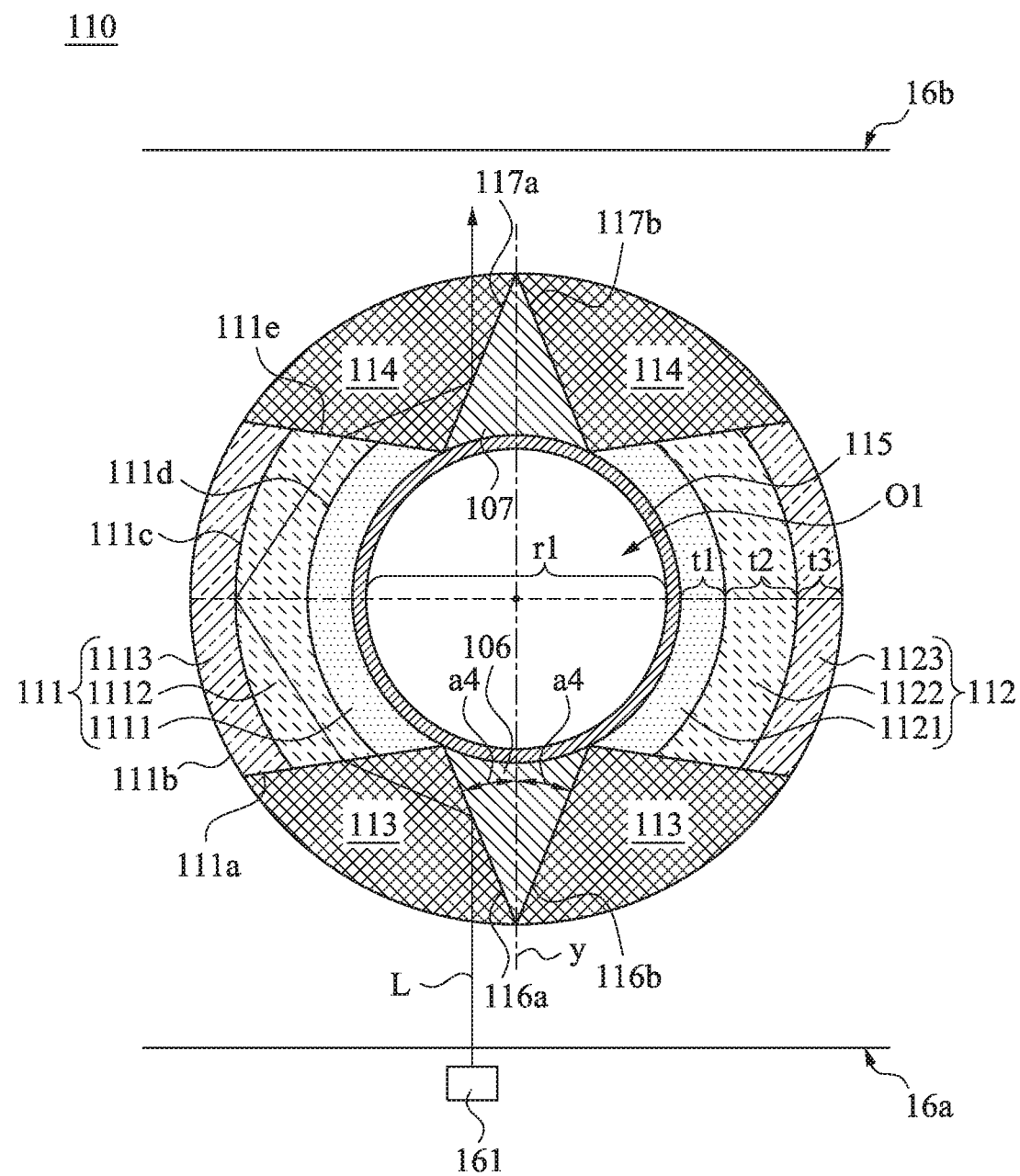
FIG. 11 is a top view of a light guide element according to another embodiment of the present disclosure.

As shown in FIG. 11, the second reflective part 107 and the first reflective part 106 in the present embodiment are disposed on two opposite sides of the first opening O1, and they are presented as symmetrically designed. It should be understood that the degrees of inclination of the reflective surface 106a, the reflective surface 106b, the reflective surface 107a, and the reflective surface 107b can be adjusted according to actual needs, and thus it is not limited to those shown in FIG. 10.

Finally, referring to FIG. 11, which illustrates a top view of a light guide element 110 according to another embodiment of the present disclosure. As shown in FIG. 11, the light guide element 110 is similar to the light guide element 100, and the difference is that the first refractive part 111 and the second refractive part 112 of the light guide element 110 respectively include a plurality of refractive layers.

As shown in FIG. 11, the first refractive part 111 includes a first refractive layer 1111, a second refractive layer 1112, and a third refractive layer 1113. The first refractive layer 1111, the second refractive layer 1112, and the third refractive layer 1113 are sequentially arranged in a direction away from the first opening O1. The first refractive layer 1111 is adjacent to the reflective ring 115. The second refractive layer 1112 surrounds the first refractive layer 1111. The third refractive layer 1113 surrounds the second refractive layer 1112. In the present embodiment, the first refractive layer 1111, the second refractive layer 1112, and the third refractive layer 1113 may be made of transparent refractive materials, such that the first refractive layer 1111 has the refractive index n11, the second refractive layer 1112 has the refractive index n12, and the third refractive layer 1113 has the refractive index n13.

Similarly, the second refractive part 112 includes a first refractive layer 1121, a second refractive layer 1122, and a third refractive layer 1123. The first refractive layer 1121 is adjacent to the reflective ring 115. The second refractive layer 1122 surrounds the first refractive layer 1121. The third refractive layer 1123 surrounds the second refractive layer 1122. In the present embodiment, the first refractive layer 1121, the second refractive layer 1122, and the third refractive layer 1123 may be made of transparent refractive materials, such that the first refractive layer 1121 has the refractive index n11, the second refractive layer 1122 has the refractive index n12, and the third refractive layer 1123 has the refractive index n13. In other words, in the present embodiment, the second refractive part 112 and the first refractive part 111 are mirror-symmetrical to each other.

In the present embodiment, the refractive index n12 is greater than the refractive index n13, and the refractive index n13 is greater than the refractive index n11. In other words, the refractive indices of the first refractive layer 1111, the second refractive layer 1112, and the third refractive layer 1113 are different from each other. In the present embodiment, the refractive index n11, the refractive index n12, and the refractive index n13 are all greater than the third refractive index n3 of the third refractive part 113. Therefore, when the light L is incident on the first refractive part 111, the deflection is occurred at the interface 111a. The degree of the deflection is various according to the location where the light L enters.

Specifically, the greater the difference between the refractive indices of two adjacent media is, the greater the degree of deflection is. Therefore, by appropriately adjusting the refractive indices of the first refractive layer 1111, the second refractive layer 1112, and the third refractive layer 1113, the amount of deflection of the light L incident with different angles can be more accurately adjusted, so that most of the light L can be transmitted to the fourth refractive part 114.

Furthermore, as shown in FIG. 11, the refractive indices of the first refractive layer 1111, the second refractive layer 1112, and the third refractive layer 1113 are different from each other. Therefore, in addition to an interface 111b existed between the third refractive layer 1113 and the external medium, there is an interface 111c between the third refractive layer 1113 and the second refractive layer 1112 inside the first refractive part 111 and there is an interface 111d between the second refractive layer 1112 and the first refractive layer 1111. The interface 111b, the interface 111c, and the interface 111d may have the same or different total reflection angles from each other. Since there are a plurality of interfaces in the first refractive part 111, there is more chance of generating total reflection during the traveling of the light L in the first refractive part 111 to reach the fourth refractive part 114 behind the first opening O1.

In the present embodiment, since the first refractive part 111 has a plurality of interfaces, the light L can be effectively confined within the first refractive part 111. Since the second refractive layer 1112 has the greater refractive index n12, furthermore, most of the light L is confined within the second refractive layer 1112. As a result, after most of the light L enters the first refractive part 111 from the interface 111a, it leaves the first refractive part 111 through the interface 111e rather than leaving the interface 111b through the interface 111b or entering the reflective ring 115. Therefore, in some embodiments, it can remove the reflective ring 115 and still has a good light guiding effect. In the embodiment in which the reflective ring 115 is removed, the refractive index n11 of the first refractive layer 1111, the refractive index n12 of the second refractive layer 1112, and the refractive index n13 of the third refractive layer 1113 may be greater than the refractive index $n_{air}$ (approximately equal to 1) of the air in the first opening O1, and thus it is further ensured that the light L is unable to enter the first opening O1.

In the present embodiment, the first refractive part 111 includes three refractive layers. However, in some embodiments, the first refractive part 111 may include two, four, or more refractive layers. For example, the first refractive part 111 in FIG. 11 may include only the first refractive layer 1111 and the second refractive layer 1112 in which the refractive index n11 is smaller than the refractive index n12, so that it also can prevents the light L from entering the first opening O1.

As shown in FIG. 11, the vertical axis y at the connection of the reflective surface 116a and the reflective surface 116b is perpendicular to the first side 16a and the second side 16b. There is an angle a4 between the reflective surface 116a and the vertical axis y, and there is also an angle a4 between the reflective surface 116b and the vertical axis y with opposite direction. In the present embodiment, the following mathematical relationship (2) between the angle a4, the refractive index $n_{1112}$ of the second refractive layer 1112 and the refractive index $n_{1113}$ of the third refractive layer 1113 is satisfied by:

$$a4 > \frac{\pi}{2} - \arcsin\left(\frac{n_{1112}}{n_{1113}} * \sin\left(\frac{\pi}{2} - \arcsin\left(\frac{n_{1113}}{n_{1112}}\right)\right)\right) \quad (2)$$

As shown in FIG. 11, the second reflective part 117 and the first reflective part 116 in the present embodiment are disposed on two opposite sides of the first opening O1, and they are presented as a symmetrical design. It should be understood that the degrees of inclination of the reflective surface 116a, the reflective surface 116b, the reflective surface 117a, and the reflective surface 117b can be adjusted according to actual needs, and thus it is not limited to those shown in FIG. 11.

As shown in FIG. 11, in the present embodiment, the first refractive layer 1111, the second refractive layer 1112, and the third refractive layer 1113 are all circular arcs, and the three are concentric with each other. The first refractive layer 1111 has a thickness t1, the second refractive layer 1112 has a thickness t2, and the third refractive layer 1113 has a thickness t3.

Specifically, the thickness t1 refers to the difference between the radius of curvature of the surface of the first refractive layer 1111 close to the reflective ring 115 and the radius of curvature of the surface of the first refractive layer 1111 away from the reflective ring 115. The thickness t2 refers to the difference between the radius of curvature of the surface of the second refractive layer 1112 close to the reflective ring 115 and the radius of curvature of the surface of the second refractive layer 1112 away from the reflective ring 115. The thickness t3 refers to the difference between the radius of curvature of the surface of the third refractive layer 1113 close to the reflective ring 115 and the radius of curvature of the surface of the third refractive layer 1113 away from the reflective ring 115. In the present embodiment, the sum of the thickness t1, the thickness t2, and the thickness t3 may be less than 5% of the inner diameter r1 of the first opening O1. It should be understood that the drawings are not shown in the actual scale for explanation.

Various embodiments of the light guide element 162 in FIG. 4 have been described above with reference to FIG. 5 to FIG. 11. In other words, the user can mount the light guide elements 50-110 shown in FIG. 5 to FIG. 11 in the backlight module 16 in FIG. 4. However, in some embodiments, the light guide element 162 can be integrally formed with the light guide plate 164.

The light guide element 50 illustrated in FIG. 5 is taken as an example herein. The refractive indices of the third refractive part 53 and the fourth refractive part 54 of the light guide element 50 are the same as the refractive index of the light guide plate 164, so that the third refractive part 53, the fourth refractive part 54, and the light guide plate 164 can be integrally formed with the same material. In such an embodiment, the first refractive part 51 and the second refractive part 52 are disposed on the light guide plate 164. Similarly, the first refractive parts 61-111 and/or the second refractive parts 62-112 of the light guide elements 60-110 in FIG. 6 to FIG. 11 may be integrally formed with the same material as the light guide plate 164.

To sum up, the electronic device provided in the present disclosure has an opening located in the display area and the camera module is disposed in the opening, and such design reduces the area of the frame region required by the electronic device and increases the display area correspondingly. On the other hand, the electronic device provided in the present disclosure further includes a specially designed backlight module for guiding the light emitted by the light emitting element to be uniformly distributed in the display area of the camera module relative to one side of the light emitting element, so that the overall brightness of the display area is uniform.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

What is claimed is:

1. A backlight module, comprising: a light guide plate having a first side and a second side opposite the first side; a light emitting element adjacent to the first side of the light guide plate; and a light guide element disposed in the light guide plate and forming a first opening therein, the light guide element comprising a first refractive part, a second refractive part, wherein the first refractive index is equal to the second refractive index and smaller than the refractive index of the light guide plate, a third refractive part, and a fourth refractive part, wherein the third refractive part is connected the first refractive part and the second refractive part, the fourth refractive part is connected the first refractive part and the second refractive part, the third refractive part and the fourth refractive part are located on two opposite sides of the first opening, the third refractive part is closer to the first side than the fourth refractive part, the first refractive part has a first refractive index, the second refractive part has a second refractive index, the first refractive index and the second refractive index are different from a refractive index of the light guide plate, and wherein an orthogonal projection of the first refractive part and an orthogonal of the second refractive part on the first side are non-overlapped with each other.

2. The backlight module of claim 1, wherein the first refractive part and the second refractive part are located on two opposite sides of the first opening.

3. The backlight module of claim 1, wherein the third refractive part has a third refractive index, the fourth refractive part has a fourth refractive index, wherein the third refractive index is equal to the fourth refractive index.

4. The backlight module of claim 3, wherein the third refractive index is equal to the refractive index of the light guide plate.

5. The backlight module of claim 4, wherein the third refractive part and the fourth refractive part are integrally formed with the light guide plate.

6. The backlight module of claim 1, wherein there is a first interface between the first refractive part and the third refractive part, and there is a second interface between the second refractive part and the third refractive part, wherein the first interface and the second interface are separated from each other.

7. The backlight module of claim 6, wherein the light guide element further comprises:
a first reflective part disposed in the third refractive part, directly connected to the first opening, and located between the first interface and the second interface.

8. The backlight module of claim 7, wherein the first reflective part has a first reflective surface and a second reflective surface, the first reflective surface is connected to the first interface, the second reflective part is connected to the second interface, and the first reflective surface is connected to the second reflective surface.

9. The backlight module of claim 8, wherein an angle between the first reflective surface and the second reflective surface is between 24 degrees and 166 degrees.

10. The backlight module of claim 7, wherein the light guide element further comprises:
a second reflective part disposed in the fourth refractive part, and the second reflective part and the first reflective part are located on two opposite sides of the first opening.

11. The backlight module of claim 1, wherein the light guide element further comprises:
a reflective ring disposed on an inner surface of the first opening.

12. The backlight module of claim 1, wherein the first refractive part has a plurality of refractive layers, and the refractive layers sequentially arranged in a direction away from the first opening.

13. The backlight module of claim 12, wherein the refractive layers comprises:
a first refractive layer surrounding a portion of the first opening; and
a second refractive layer surrounding the first refractive layer.

14. The backlight module of claim 13, wherein a refractive index of the first refractive layer is smaller than a refractive index of the second refractive layer.

15. The backlight module of claim 14, wherein the first refractive part comprises:
a third refractive layer surrounding the second refractive layer, wherein a refractive index of the third refractive layer is between the refractive index of the first refractive layer and the refractive index of the second refractive layer.

16. The backlight module of claim 1, wherein a distance d between an outer edge of the light guide element and the first opening and a radius R of the first opening satisfy $d \leq R/10$.

17. The backlight module of claim 1, wherein the light guide plate has a second opening, and the light guide element is detachably disposed in the second opening.

18. The backlight module of claim 1, wherein a distance between the light guide element and the second side is smaller than a distance between the light guide element and the first side.

* * * * *